(12) United States Patent
Bremer et al.

(10) Patent No.: US 8,601,001 B2
(45) Date of Patent: Dec. 3, 2013

(54) SELECTIVELY STRUCTURING A TABLE OF CONTENTS FOR ACCESSING A DATABASE

(75) Inventors: John F. Bremer, Bellingham, WA (US); Patrick J. Eames, Newcastle, WA (US); Michael W. Donovan, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 2075 days.

(21) Appl. No.: 11/191,642

(22) Filed: Jul. 28, 2005

(65) Prior Publication Data

US 2007/0027897 A1  Feb. 1, 2007

(51) Int. Cl.
*G06F 7/00* (2006.01)

(52) U.S. Cl.
USPC .......................................... 707/748; 707/769

(58) Field of Classification Search
None
See application file for complete search history.

(56) References Cited

U.S. PATENT DOCUMENTS

| | | | | |
|---|---|---|---|---|
| 6,199,098 | B1 * | 3/2001 | Jones et al. | 709/203 |
| 6,732,102 | B1 * | 5/2004 | Khandekar | 707/10 |
| 7,343,554 | B2 * | 3/2008 | Waldorf et al. | 715/234 |
| 2003/0135520 | A1 * | 7/2003 | Mitchell et al. | 707/200 |
| 2004/0125124 | A1 * | 7/2004 | Kim et al. | 345/716 |
| 2004/0162853 | A1 * | 8/2004 | Brodersen et al. | 707/104.1 |
| 2005/0125431 | A1 * | 6/2005 | Emmick et al. | 707/100 |
| 2005/0177595 | A1 * | 8/2005 | Krieg et al. | 707/104.1 |
| 2005/0182768 | A1 * | 8/2005 | Waldorf et al. | 707/10 |
| 2005/0203819 | A1 * | 9/2005 | Rogers et al. | 705/35 |

OTHER PUBLICATIONS

O'Reilly, JavaScript & DHTML Cookbook, pp. 307-317.
Srini Venigalla, Expanding Recursive Opportunities with SQL UDFs in DB2 v7.2, Mar. 4, 2004.

* cited by examiner

*Primary Examiner* — Apu Mofiz
*Assistant Examiner* — Thu Nga Nguyen
(74) *Attorney, Agent, or Firm* — Harness, Dickey & Pierce, P.L.C.

(57) ABSTRACT

A computer-based system for accessing content. The system includes a database in which the content is included in a plurality of content nodes. Each content node is uniquely identified by an identifier in a database table. The table is configured recursively to represent the content nodes. A browser uses one of the identifiers to format a table of contents (TOC) node referring to the corresponding content node. The browser inserts the TOC node into a TOC for accessing one or more of the content nodes. The TOC is recursively configurable in accordance with at least a portion of the table configuration.

19 Claims, 9 Drawing Sheets

```
         ┌─<SPAN> <!-Container element for a group of sister DIV nodes-->
    608 │ ┌─<DIV> <!-Container element for node and its subtree-->
        │ │   <IMG/> <!-Plus/minus sign with event listener to expand/collapse
        │ │   a nested SPAN node (if one exists)-->
        │ │   <A><SPAN>Viewable Text</SPAN></A> <!Hyperlinked Viewable TOC
        │ │   item->
    604 │ │     <!--additional nested SPAN node may go here-->
        │ └─</DIV
        │     <!--additional sister DIV nodes(s) may go here-->        ↘
        └─</SPAN>                                                         ↘ 600
                          FIG.9A
```

```
           <DIV class=OLRow id=line0>
    610 ──── <IMG id=widget0 onclick=toggle(this,0)>
               <A><SPAN>Viewable TOC item</SPAN></A>
        ┌─>  <SPAN class=OLBlock id=OLBlock0 style="DISPLAY: block"
        │    blocknum="0">                                     ↘
    616 │        <DIV ...</DIV>                                   ↘ 608
        │        <DIV>...</DIV>
        └─>  </SPAN>
           </DIV>        FIG.9B
```

```
                                ┌─ 666          ┌─ 662                ┌─ 650
    654  ┌─><SPAN id=renderedOL>
         ├─><DIV class=OLRow id=line0>
         │     <IMG id=widget0 onclick=toggle(this,0) height=16
         │     src="oplusEnd.gif" width=20->
    658  │  ┌─><A class=itemTitle title="">
         │  │   <SPAN style="POSITION:relative; TOP: -3px;
         │  │   HEIGHT: 11px">level1</SPAN>
    670  │  └─></A>
         │     <!--additional nested span tag(s) may go here-->
         ├─></DIV>
         └─></SPAN>       FIG.9C
```

```
         ┌─><SPAN class=OLBlock id=OLBlock0 style="DISPLAY: block" blocknum="0">
    708 │┌─><DIV class=OLRow id=line1><IMG height=16 src="oempty.gif" width=20>
        ││    <IMG id=widget1 height=16 src="onode.gif" width=20>
        ││    <A class=itemTitle title=""><SPAN style="POSITION: relative;
    704 ││  TOP: -3px; HEIGHT: 11px">level2.0</SPAN></A>
        │└─></DIV>
        ├─><DIV class=OLRow id=line2><IMG height=18 src="oempty.gif" width=20>
        │     <IMG id=widget2 height=16 src="onodeEnd.gif" width=20>
        │     <A class=itemTitle title=""><SPAN style="POSITION: relative;
    712 │  TOP: -3px; HEIGHT: 11px">level2.1</SPAN></A>
        ├─></DIV>
        └─></SPAN>                                           ↘
                       FIG.9D                                   ↘ 700
```

FIG. 10

```
<?xml version="1.0"?>
<opml>
    <xmlserver file="gen_toc0.asp" ipr_name="20050606" datetime="6/22/2005 10:24:35 AM"/>
    <outline>
        <outline DMC="Parent">
            <outline parent_id="1994" display_text="1E-3A-2-22-1 FRONT" child_id="1999" hasChildren="N"
document="1E-3A-2-22-1 FRONT.htm" docURL="Documents/20050606/F_958.htm" AnchorOffset="none" AnchorType="none"
doc_link="958"/>
            <outline parent_id="1994" display_text="1E-3A-2-22-1 CHAPTER 1 SYSTEMS INFORMATION"
child_id="1995" hasChildren="N" document="1E-3A-2-22-1 CHAPTER 1 SYSTEMS INFORMATION.htm"
docURL="Documents/20050606/F_954.htm" AnchorOffset="none" AnchorType="none" doc_link="954"/>
            <outline parent_id="1994" display_text="1E-3A-2-22-1 CHAPTER 2 AUTOPILOT SYSTEM"
child_id="1996" hasChildren="N" document="1E-3A-2-22-1 CHAPTER 2 AUTOPILOT SYSTEM"
docURL="Documents/20050606/F_955.htm" AnchorOffset="none" AnchorType="none" doc_link="955"/>
            <outline parent_id="1994" display_text="1E-3A-2-22-1 CHAPTER 3 SERIES YAW DAMPER SYSTEM"
child_id="1997" hasChildren="N" document="1E-3A-2-22-1 CHAPTER 3 SERIES YAW DAMPER SYSTEM.htm"
docURL="Documents/20050606/F_956.htm" AnchorOffset="none" AnchorType="none" doc_link="956"/>
            <outline parent_id="1994" display_text="1E-3A-2-22-1 CHAPTER 4 PARALLEL YAW DAMPER SYSTEM"
child_id="1998" hasChildren="N" document="1E-3A-2-22-1 CHAPTER 4 PARALLEL YAW DAMPER SYSTEM.htm"
docURL="Documents/20050606/F_957.htm" AnchorOffset="none" AnchorType="none" doc_link="957"/>
            <outline parent_id="1994" display_text="1E-3A-2-22-1 REAR"
child_id="2000" hasChildren="N" document="1E-3A-2-22-1 REAR.htm"
docURL="Documents/20050606/F_959.htm" AnchorOffset="none" AnchorType="none" doc_link="959"/>
        </outline>
    </outline>
</opml>
```

FIG. 11

```
<div class='OLRow' id='line1999'>
<img id='widget1999' src=images/empty.gif class='OLWidget' title='Click to expand/collapse nested items.' onClick='javascript:
toggleImgAndGetChildren(1994,1999,"DocumentTOC1")'> <a href=JavaScript:DoDocAction(1999) class='itemTitle'><span
id='OLContent_1999' class=OLContent AnchorType=none AnchorOffset=none doc_link=958 uri="Documents/20050606/F_958.
htm">1E-3A-2-22-1 FRONT</span></a>
<span class='OLBlock' blocknum='1999' id='OLBlock1999' loaded="false" state="collapsed"></span>
</div>
<div class='OLRow' id='line1995'>
<img id='widget1995' src=images/empty.gif class='OLWidget' title='Click to expand/collapse nested items.' onClick='javascript:
toggleImgAndGetChildren(1994,1995,"DocumentTOC1")'> <a href=JavaScript:DoDocAction(1995) class='itemTitle'><span
id='OLContent_1995' class=OLContent AnchorType=none AnchorOffset=none doc_link=954 uri="Documents/20050606/F_954.
htm">1E-3A-2-22-1 CHAPTER 1 SYSTEMS INFORMATION</span></a>
<span class='OLBlock' blocknum='1995' id='OLBlock1995' loaded="false" state="collapsed"></span>
</div>
<div class='OLRow' id='line1996'>
<img id='widget1996' src=images/empty.gif class='OLWidget' title='Click to expand/collapse nested items.' onClick='javascript:
toggleImgAndGetChildren(1994,1996,"DocumentTOC1")'> <a href=JavaScript:DoDocAction(1996) class='itemTitle'><span
id='OLContent_1996' class=OLContent AnchorType=none AnchorOffset=none doc_link=955 uri="Documents/20050606/F_955.
htm">1E-3A-2-22-1 CHAPTER 2 AUTOPILOT SYSTEM</span></a>
<span class='OLBlock' blocknum='1996' id='OLBlock1996' loaded="false" state="collapsed"></span>
</div>
<div class='OLRow' id='line1997'>
<img id='widget1997' src=images/empty.gif class='OLWidget' title='Click to expand/collapse nested items.' onClick='javascript:
toggleImgAndGetChildren(1994,1997,"DocumentTOC1")'> <a href=JavaScript:DoDocAction(1997) class='itemTitle'><span
id='OLContent_1997' class=OLContent AnchorType=none AnchorOffset=none doc_link=956 uri="Documents/20050606/F_956.
htm">1E-3A-2-22-1 CHAPTER 3 SERIES YAW DAMPER SYSTEM</span></a>
<span class='OLBlock' blocknum='1997' id='OLBlock1997' loaded="false" state="collapsed"></span>
</div>
<div class='OLRow' id='line1998'>
<img id='widget1998' src=images/empty.gif class='OLWidget' title='Click to expand/collapse nested items.' onClick='javascript:
toggleImgAndGetChildren(1994,1998,"DocumentTOC1")'> <a href=JavaScript:DoDocAction(1998) class='itemTitle'><span
id='OLContent_1998' class=OLContent AnchorType=none AnchorOffset=none doc_link=957 uri="Documents/20050606/F_957.
htm">1E-3A-2-22-1 CHAPTER 4 PARALLEL YAW DAMPER SYSTEM</span></a>
<span class='OLBlock' blocknum='1998' id='OLBlock1998' loaded="false" state="collapsed"></span>
</div>
<div class='OLRow' id='line2000'>
<img id='widget2000' src=images/empty.gif class='OLWidget' title='Click to expand/collapse nested items.' onClick='javascript:
toggleImgAndGetChildren(1994,2000,"DocumentTOC1")'> <a href=JavaScript:DoDocAction(2000) class='itemTitle'><span
id='OLContent_2000' class=OLContent AnchorType=none AnchorOffset=none doc_link=959 uri="Documents/20050606/F_959.
```

FIG. 12

SELECTIVELY STRUCTURING A TABLE OF CONTENTS FOR ACCESSING A DATABASE

STATEMENT REGARDING FEDERALLY SPONSORED RESEARCH OR DEVELOPMENT

This invention was made with Government support under Contract Number F19628-01-D-0016, DO 022 awarded by the United States Air Force. The Government has certain rights in this invention.

FIELD OF THE INVENTION

The present invention relates generally to information management and, more particularly, to accessing database content via a selectively expandable table of contents (TOC).

BACKGROUND OF THE INVENTION

Project developers frequently find it helpful to use the Internet as a medium for collaborative review of documents. In traditional web-based applications for collaborative document review, bandwidth-intensive methods typically are used to expand, in a user's computer, a table of contents (TOC) referring to the documents. The user may select a displayed TOC node, e.g., by mouse-clicking on it, to display subordinate node(s) and/or content associated with the selected node. The application then may retrieve data corresponding to the entire TOC and hide collapsed nodes. Alternatively, an entire HTML page may be refreshed each time a TOC node is expanded. Both of these techniques fail to scale as TOC size increases. Where the number of documents being reviewed is very large, low-bandwidth network bottlenecks can result which can drastically slow the review process.

SUMMARY OF THE INVENTION

The present invention, in one aspect, is directed to a computer-based system for accessing content. The system includes a database in which the content is included in a plurality of content nodes. Each content node is uniquely identified by an identifier in a table of the database. The table is configured recursively to represent the content nodes. A browser is operable to use one of the identifiers to format a table of contents (TOC) node referring to the corresponding content node. The browser inserts the TOC node into a TOC for accessing one or more of the content nodes. The TOC is recursively configurable in accordance with at least a portion of the table configuration.

In another aspect, the invention is directed to a method of providing access to content in a database. Identifiers are configured recursively in a table of the database. Each identifier uniquely identifies a corresponding content node of the database. One of the identifiers is used to retrieve from the table information for configuring a TOC node corresponding to the corresponding content node. The information is used to configure the TOC node recursively in a TOC.

In yet another aspect, the invention is directed to computer-readable media including instructions for configuring unique identifiers recursively in a table of a database, each identifier corresponding to a content node of the database. The media include instructions for using one of the identifiers to retrieve information from the table for configuring a TOC node corresponding to the corresponding content node, using the information to configure the TOC node recursively in a TOC, and retrieving content corresponding to the TOC node when the TOC node is activated.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 11 is a listing of XML formatted in accordance with one implementation of the invention; and FIG. 12 is a listing of HTML formatted in accordance with one implementation of the invention.

DETAILED DESCRIPTION OF THE PREFERRED EMBODIMENTS

The following description of the preferred embodiment(s) is merely exemplary in nature and is in no way intended to limit the invention, its application, or uses.

In one implementation of the present invention, an administrative user of a web browser graphical user interface (GUI) can selectively build a table of contents (TOC) referring to one or more documents in one or more databases. The user may add TOC nodes only for selected database nodes and/or documents. Additionally or alternatively, the user may cause a TOC node to provide a link to a selected location in a document. The TOC is available for use immediately upon being configured. When a user activates a node in the TOC, only content corresponding to the activated node is retrieved from the database.

Figure 1:
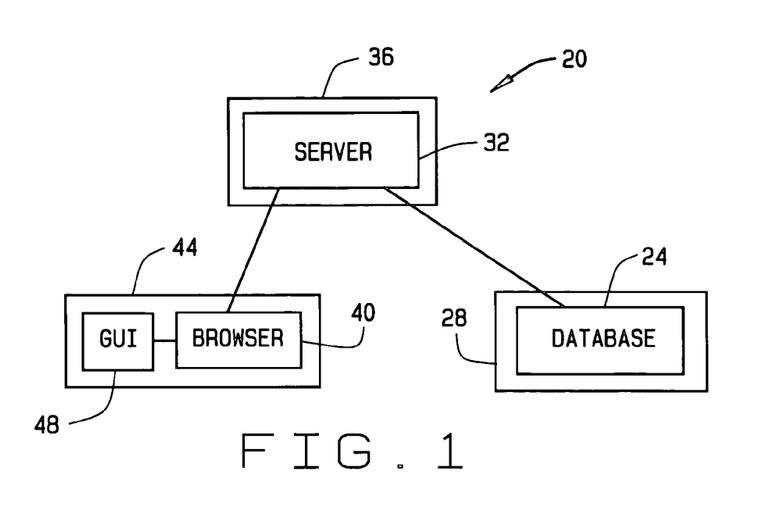
FIG. 1 is a block diagram of a computer-based system for accessing content according to one implementation of the invention.

One configuration of a computer-based system for accessing content is indicated generally in FIG. 1 by reference number 20. A database 24 resides, for example, in one or more computers, memories and/or devices as known in the art and collectively indicated by reference number 28. The database 24 includes a plurality of documents and/or other content.

Although a single database 24 is shown in the present example, system configurations including more than one database also are contemplated. The database 24 may be a SQL database, a Microsoft® Access database, or other database in accordance with principles of the present invention. A server 32 is configured to communicate with the database 24. In the present configuration, the server 32 is a web server having Active Server Page (ASP) capability, although other servers could be used. Any server that can broker a request for node information from the database 24 may be used including standard web server protocols for creating dynamic content, GCI, JSP, etc. The server 32 may be, but is not necessarily, remote from the database 24 and may communicate with the database 24 via a network such as the Internet. In another configuration, the server could be included with the database, for example, in an intranet. In yet other configuration, a single computer could include both the server 32 and the database 24. In the present exemplary configuration, the server 32 resides in a computer 36.

The server 32 has one or more clients, e.g., a web browser 40 resident in a user's computer 44 and accessible by the user via a graphical user interface (GUI) 48. The terms "server" and/or "browser" are used primarily to refer to software executable to perform various functions described herein. It will be appreciated by those skilled in the art that there are many different hardware and software configurations that could be implemented in accordance with the principles of present invention. Thus the foregoing examples of hardware and software configurations are exemplary only.

Figure 2A:
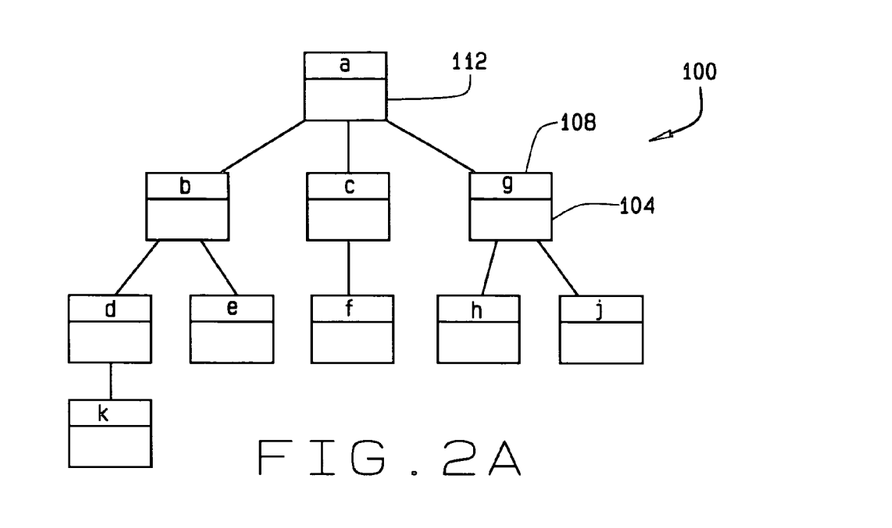
FIG. 2A is a block diagram of a database tree structure according to one implementation of the invention.

An exemplary tree structure of the database 24 is indicated generally in FIG. 2A by reference number 100. It should be noted that the database 24 could be alternatively structured in other implementations, provided that TOC information is accessible recursively in the database 24 as further described below. The tree structure 100 includes a plurality of content nodes 104. Each node 104 includes and is identified by a database-generated unique identifier 108, e.g., a Globally Unique ID (GUID). Where, for example, the database 24 includes one or more documents, a unique identifier could be, e.g., a string of alphanumerics including a key identifier describing a chapter and/or page number useful in identifying a document location. For the sake of simplicity, each content node 104 shown in FIG. 2A is uniquely identified by, and may be referred to in this description by, a single letter.

A node 104 may be related to another node 104 as a parent, child, or sister node. For example, a node "d" is the parent of a node "k", a child of a node "b", and a sister of a node "e". Where the database 24 content is arranged in documentary form, a root node 112 (node "a" in the present example) may include, for example, a directory of the content of the tree 100. Accordingly, child nodes of the root 112 may include subdirectories and/or database content. Content may be included at increasing levels of detail in subsequent child nodes. Child and/or sister nodes may be added to and/or removed from the tree 100 in any order. It should be noted that other and additional tree structures may be included in the database 24. One or more trees could be combined into a larger tree by adding a new root node. The new root node would have as child nodes the former root nodes of the trees being combined. Content in nodes 104 may also include referential links (e.g., hyperlinks) to other content nodes and/or content node locations. For example, a document describing an equipment repair procedure might include one or more links to illustrations of the procedure.

Figure 2B:
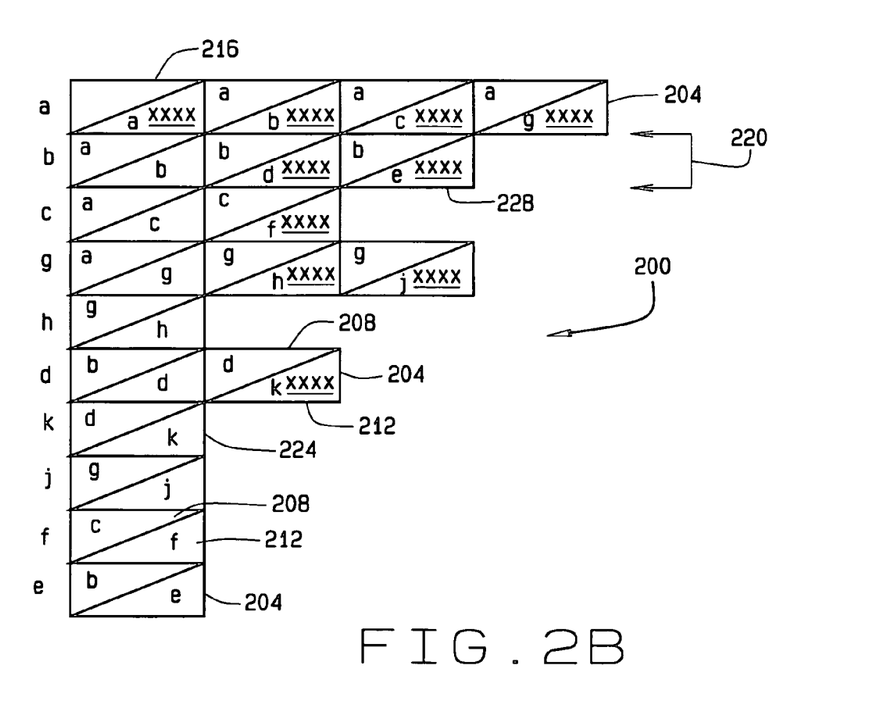
FIG. 2B is a block diagram of a database table according to one implementation of the invention.

The database 24 also includes a table indicated generally in FIG. 2B by reference number 200. Each content node 104 is represented in the table 200 by its unique identifier 108. The table 200 is configured recursively to represent the database content nodes 104. More specifically and for example, the content nodes 104 are represented in the table 200 as parent-child pairs 204. A parent-child pair 204 includes a representation 208 of a parent node and a representation 212 of a child node of that parent. Since a root node 112 has no parent, a parent-child pair 216 representing the root node 112 as a child does not include a typical parent node representation.

Parent-child pairs 204 are configured in rows 220. In a given row 220, an "end" parent-child pair 224 represents a given node 104 and its parent node 104. If the given node has any child node(s), pair(s) 204 representing such child node(s) as child(ren) of the given node are included in the same row 220. For example, as shown in FIG. 2B, the parent-child pair 216 for the root node "a" is associated with a row 220 of parent-child pairs representing nodes "b", "c", and "g" as child nodes of the node "a" (and thus as sister nodes of one another). Each parent-child pair 204 also includes or refers to text and/or other content 228 that may be displayed as text and/or a referential link in a TOC as further described below. When a content node 104 is added to the tree 100, a parent-child pair 204 is added to the appropriate row 220 of the table 200. It will be appreciated by those skilled in the art that references to "rows", "end" pairs and/or data configurations are illustrative only. Data could be stored in various ways in accordance with various implementations of the invention.

Figure 3:
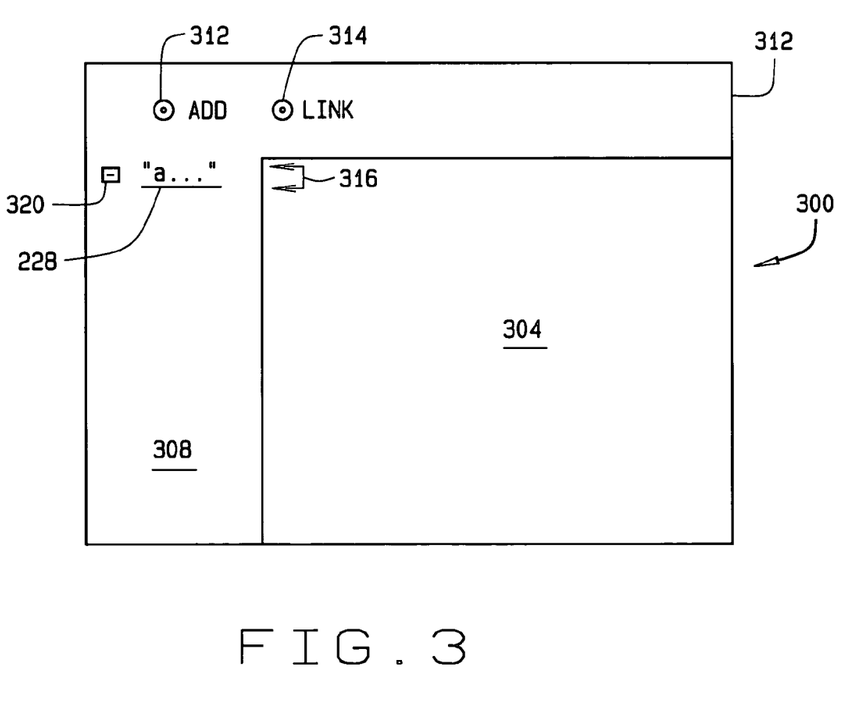
FIG. 3 is a simplified view of a browser page displayed in a graphical user interface (GUI) according to one implementation of the invention.
Figure 4:
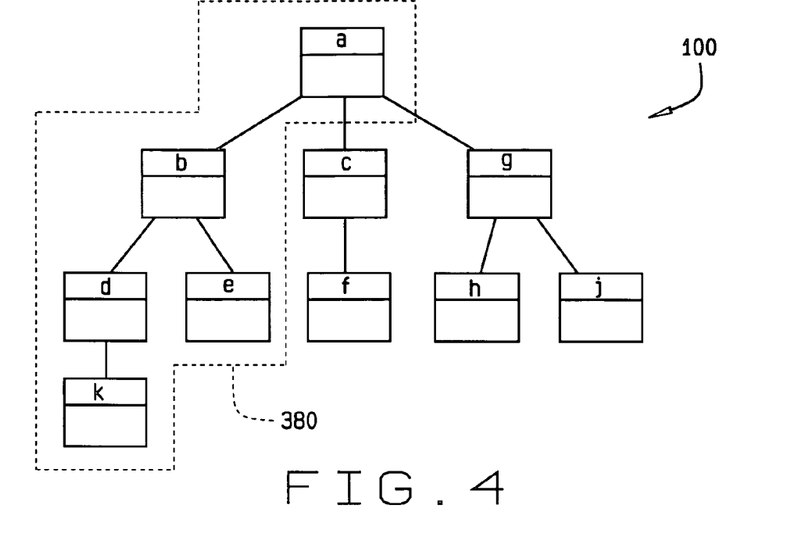
FIG. 4 is a block diagram of a database tree structure according to one implementation of the invention.

One implementation of a method of selectively configuring a table of contents shall be described with reference to FIG. 3, in which an exemplary page generated by the browser 40 is indicated generally by reference number 300. The page 300 includes a frame 304 in which documents may be displayed. A TOC may be configured in a frame 308, and user control functions are provided in a frame 310. For example, a control button 312 may be used to add a TOC node. A button 314 may be used to link to a document location as further described below. Each frame may be individually refreshed when displayed in the GUI 48. Displayed in the frame 308, for example, is a TOC node 316 for the root node 112 (shown in FIG. 2A), including a plus/minus button 320 and the viewable text 228 (shown in FIG. 2B) typically descriptive of the root node 112. A user, e.g., an administrator desiring to establish a collaborative review of selected documents in the database 24, e.g., documents indicated by reference number 380 in FIG. 4, may configure a TOC in accordance with a method indicated generally in FIG. 5 by reference number 400.

Figure 5:
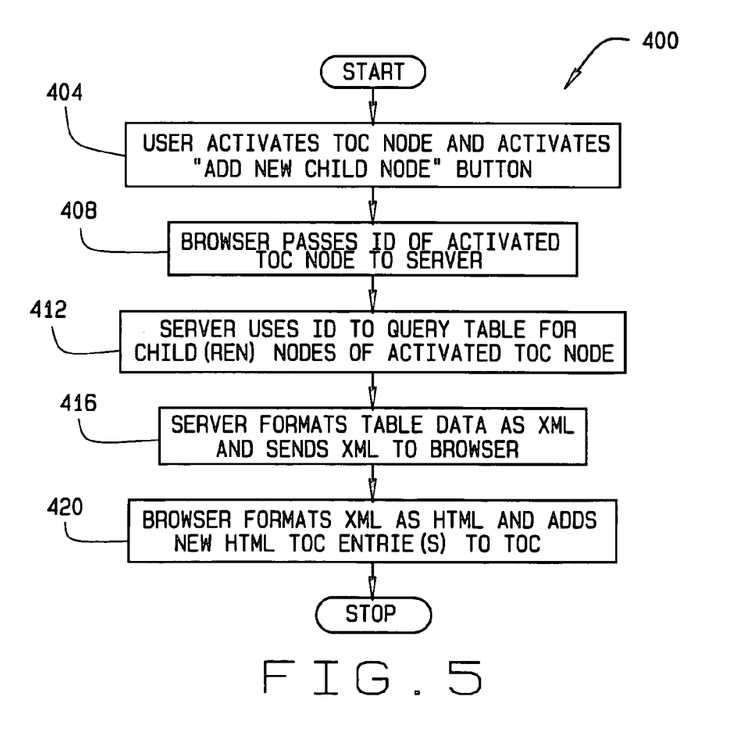
FIG. 5 is a flow diagram of a method of selectively configuring a table of contents (TOC) according to one implementation of the invention.
Figure 6A:
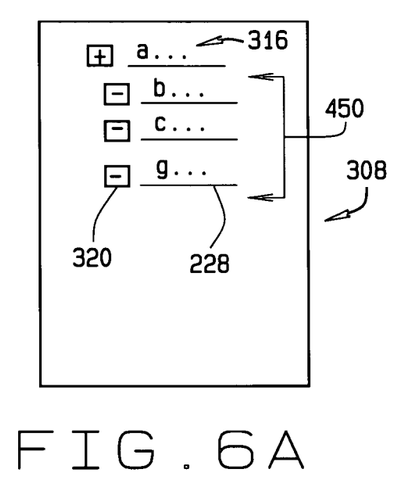
FIGS. 6A-6D are simplified views of a frame including a TOC generated by a browser in a graphical user interface (GUI) according to one implementation of the invention.

In step 404, the user activates a TOC node (in the first instance in the present example, the plus/minus button 320 for the root TOC node 316) and activates the button 312 to add a new child node to the TOC. In step 408, the browser 40 passes the unique ID 108 of the activated TOC node to the server 32. In step 412 the server 32 uses the unique ID 108 of the clicked TOC node to query the database table 200 for child(ren) nodes of the node 104 corresponding to the clicked TOC node. Specifically, the server 32 uses the unique ID 108 to access the row 220 corresponding to the activated TOC parent node. Thus, for example, when the root TOC node 316 corresponding to the root content node "a" is activated, the server 32 accesses the "first" row 220 of the table 200 and retrieves TOC information for the child nodes "b", "c" and "g". In step 416 the server 32 formats the TOC information as XML and returns the TOC information as XML to the browser 40. In step 420 the browser 40 formats the XML data as HTML, as further described below, and adds new TOC entrie(s) to the frame 308. Thus, for example, as shown in FIG. 6A, new TOC nodes 450 for content nodes "b", "c" and "g" are displayed in the frame 308 beneath the TOC node 316 for the root node "a". It should be noted that in the present implementation, configuring new TOC nodes in the frame 308 does not cause content from content nodes 104 to be retrieved from the database 24.

Figure 6B:
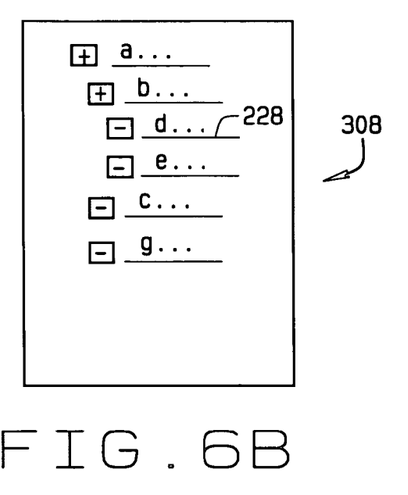
Figure 6C:
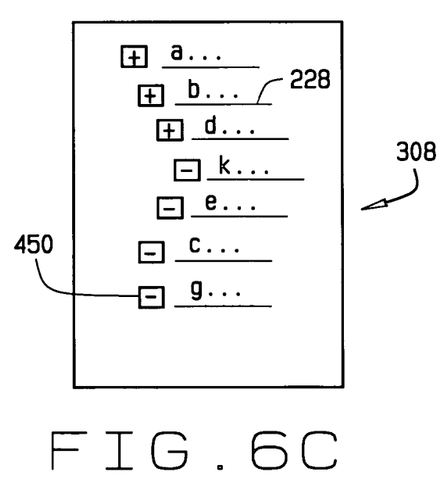

In the present example, the user also wishes to include content in nodes "d", "e" and "k" for collaborative review. Accordingly, the method 400 may be repeated as desired. Thus the user, in repeating step 404, clicks on a plus/minus button for the TOC node "b" to cause new child TOC nodes to be added for the content nodes "d" and "e" through performance of steps 408 through 420. TOC nodes are displayed in the frame 308 as shown in FIG. 6B. When the user subsequently activates the TOC node "d" in step 404, steps 408 through 420 are repeated and a TOC node "k" is displayed in the frame 308 as shown in FIG. 6C. It should be noted that identifiers 108 are included in text areas 228 of FIGS. 3 and 6 simply to enhance understanding of the present example. Identifiers 108 may or may not be included in text descriptions 228 displayed in a TOC.

In some implementations, TOC nodes may be configured to provide a TOC automatically. For example, where an administrator submits a list of selected documents to the system 20, the system 20 may use data in the table 200 to produce and display a TOC that includes a TOC node for each document. TOC nodes configured in such manner may be the only TOC nodes in such a TOC. Content corresponding to a given TOC node is not retrieved from the database 24 until a user, e.g., a person reviewing the selected documents, subsequently activates the given TOC node as further described below. Automatic TOC generation may be based, e.g., on a naming convention for files being loaded. It can be convenient to use file names that can be parsed into a TOC. For example, a file named "1E-3A-2-71-1CL-1" could be automatically parsed into a TOC by breaking it at all or some of the dashes. Breaking the name at particular dashes may be done in order to "flatten" the TOC per user preference, depending on a number of documents. Once an automatic TOC has been created, an administrator can add additional descriptive text to the nodes if desired.

Figure 6D:
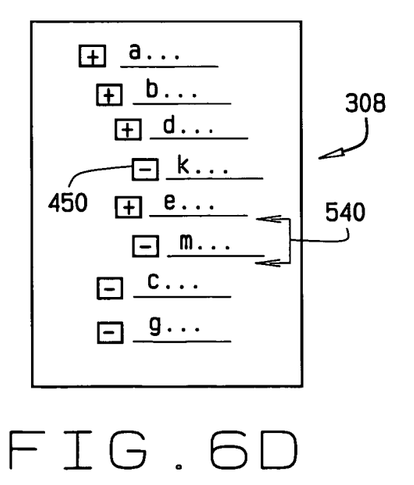
Figure 7:
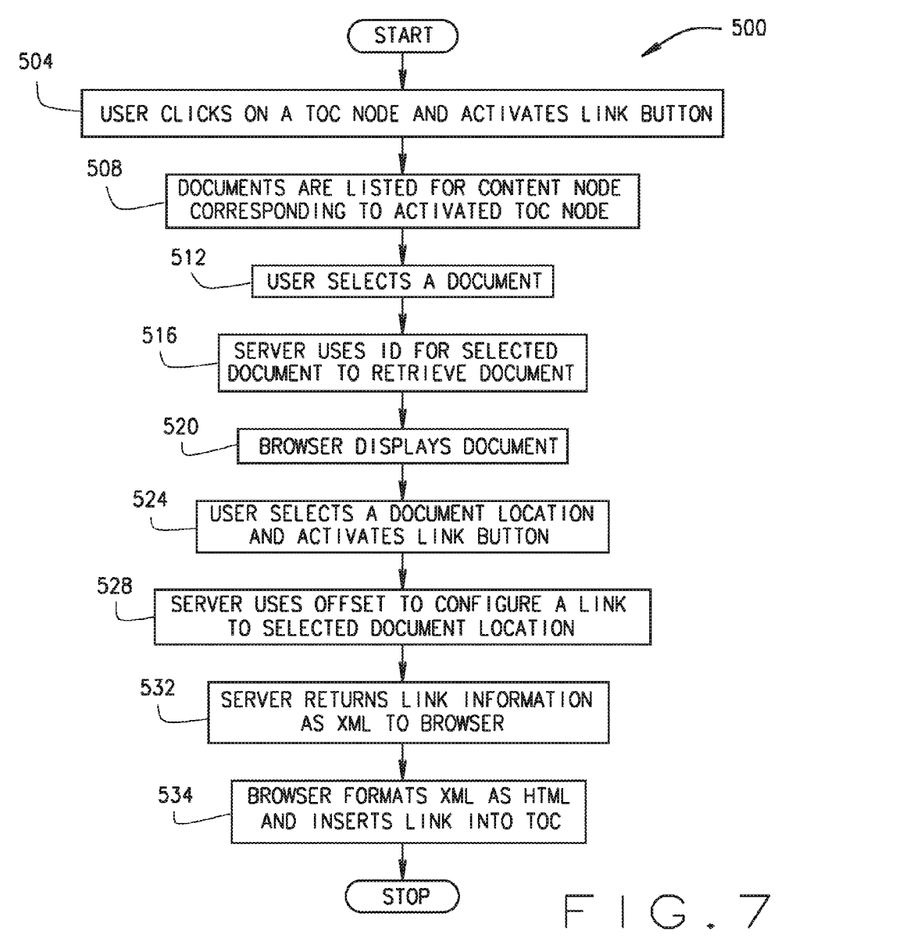
FIG. 7 is a flow diagram of a method of configuring a link to a location in a content node according to one implementation of the invention.
Figure 8:
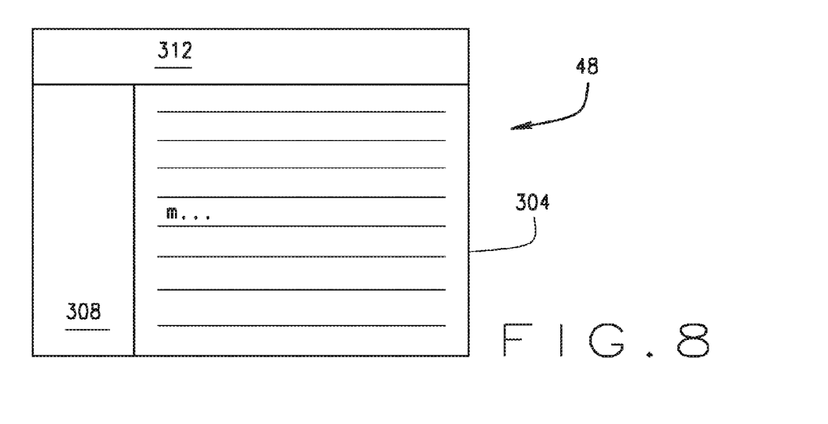
FIG. 8 is a simplified view of a browser page displayed in a graphical user interface (GUI) according to one implementation of the invention.

The administrative user may wish to configure a TOC node that provides a link to a specific location in a document, i.e., to a specific location in a content node 104, for example, to skip over documentary material not needed for review. Thus the user may configure a link to a desired document location in accordance with a method indicated generally in FIG. 7 by reference number 500. In step 504 the user clicks on a TOC node and activates the button 314 to link the activated TOC node to a document and document location. In step 508, document(s) included in the content node 104 corresponding to the activated TOC node are listed in the document frame 304. The user in step 512 may select one of the listed document(s). In step 516 the server 32 uses the unique ID 108 for the selected node 104 to access and retrieve the selected document. In step 520 the browser 40 displays the document in the frame 304. In step 524 the user scrolls down to a desired document location, highlights the location, and again activates the link button 314. In step 528 the server 32 determines an offset from a beginning of the selected document to the highlighted document location and uses the offset to configure a link to the highlighted location. In step 532 the server 32 returns the link information as XML to the browser 40. In step 534 the browser 40 formats the XML data as HTML, as further described below, and displays in the frame 308 a new TOC entry containing the link information. For example, referring to FIG. 6C, if the user wishes to add a TOC link referring to a location "m" in a document referred to by the TOC node "e", the user may select the document as previously described. The selected document may be displayed in the GUI 48 as shown in FIG. 8. The user highlights the document location "m", and a TOC link 540 to the document location "m" is inserted in the TOC as shown in FIG. 6D.

Figure 9A:
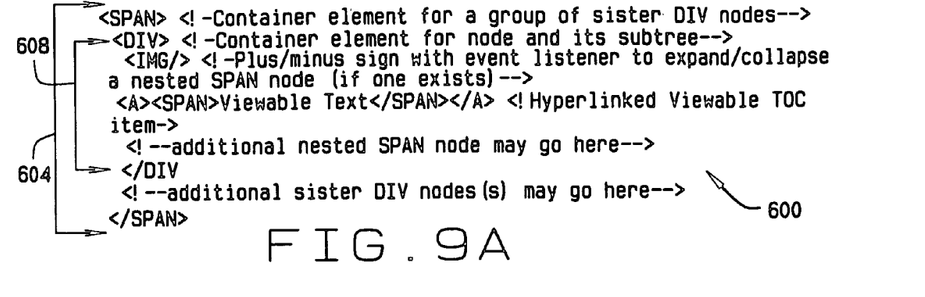
FIGS. 9A-9D are listings of exemplary HTML for configuring TOC nodes according to one implementation of the invention.

The browser 40 formats XML received from the server 32 into HTML. The browser 40 may use, e.g., JavaScript and HTML Document Object methods to dynamically write HTML TOC content and may use, for example, CSS (Cascading Style Sheets) to recursively lay out the nested content on the page 300. A TOC configured in accordance with principles of the invention is recursive in that each viewable tree view item may be represented by a HTML node structure, for example, as indicated generally in FIG. 9A by reference number 600. Generally, HTML nodes are nested within other HTML nodes to form a tree view. An outer SPAN node 604 encloses one or more sister DIV nodes 608. Within a sister DIV node 608 may be nested one or more SPAN nodes, and so on. It should be noted generally that other or additional ways could be used to form nodes that recursively compose a tree structure.

Figure 9B:
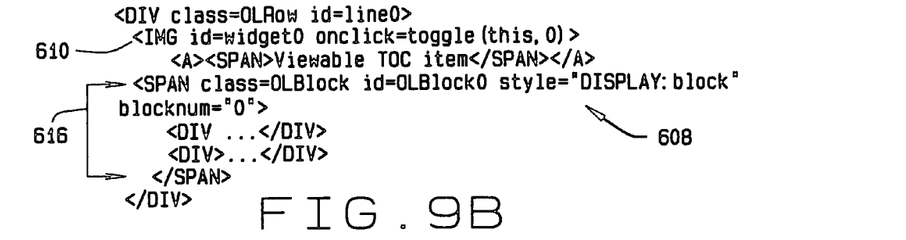

An exemplary sister DIV node 608 is shown in FIG. 9B. A TOC sub-tree may be expanded or collapsed in the following exemplary manner. An image tag 610 for the plus/minus sign 320 has an event listener 612 that toggles the style of a SPAN grouping 616 of nested child TOC nodes to make the SPAN grouping 616 visible or invisible. A SPAN grouping is visible when its style attribute is set as "DISPLAY: block". A SPAN grouping is invisible when its style attribute is set as "DISPLAY: none". The unique identifiers 108 of the content nodes 104 are used in the table 200 and in the HTML node structure, e.g., in "id" fields of SPAN and DIV nodes. Thus, for example, a numeric portion of an "id" of a DIV node 608 may match a numeric portion of an "id" of a SPAN node 616 nested within the DIV node 608.

Figure 9C:
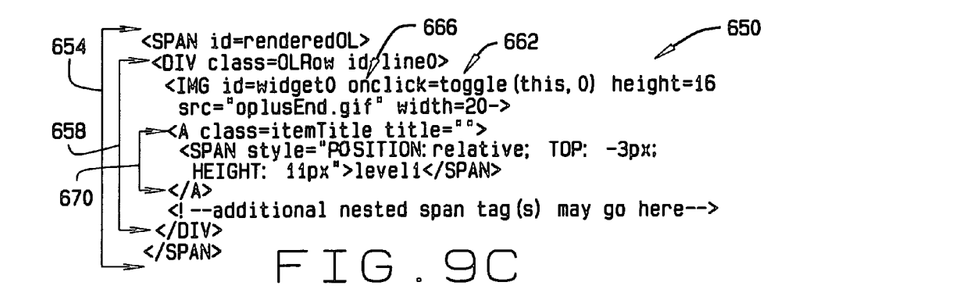

A TOC entry for a root content node 112 may be configured and displayed in the frame 308 in the same or a similar manner as other TOC nodes. An example of HTML syntax for adding a root TOC node is indicated generally in FIG. 9C by reference number 650. In the present implementation, a SPAN node 654 for a root node 112 contains all HTML for configuring a TOC. A DIV node 658 contains a line item sub-tree. An "IMG" tag 662 shows whether a line item sub-tree is expanded or collapsed and contains an event listener 666 to capture clicks signaling node expansion or collapse. "A" tags 670 contain visible content positioned in the TOC relative to and descriptive of the parent DIV node 658.

Figure 9D:
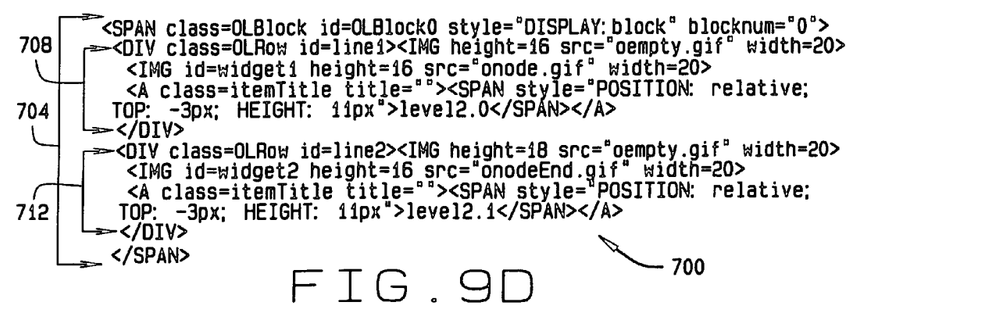

An example of HTML syntax for adding child TOC nodes is indicated generally in FIG. 9D by reference number 700. In a SPAN node 704, "<SPAN class=OLBlock . . . >" contains child DIV nodes 708 and 712. In the child DIV node 708, "<DIV class=OLRow id=line1 . . . >" contains a line item sub-tree for the child node 708. In the child DIV node 712, "<DIV class=OLRow id=line2 . . . >" contains a line item sub-tree for the child node 712.

Figure 10:
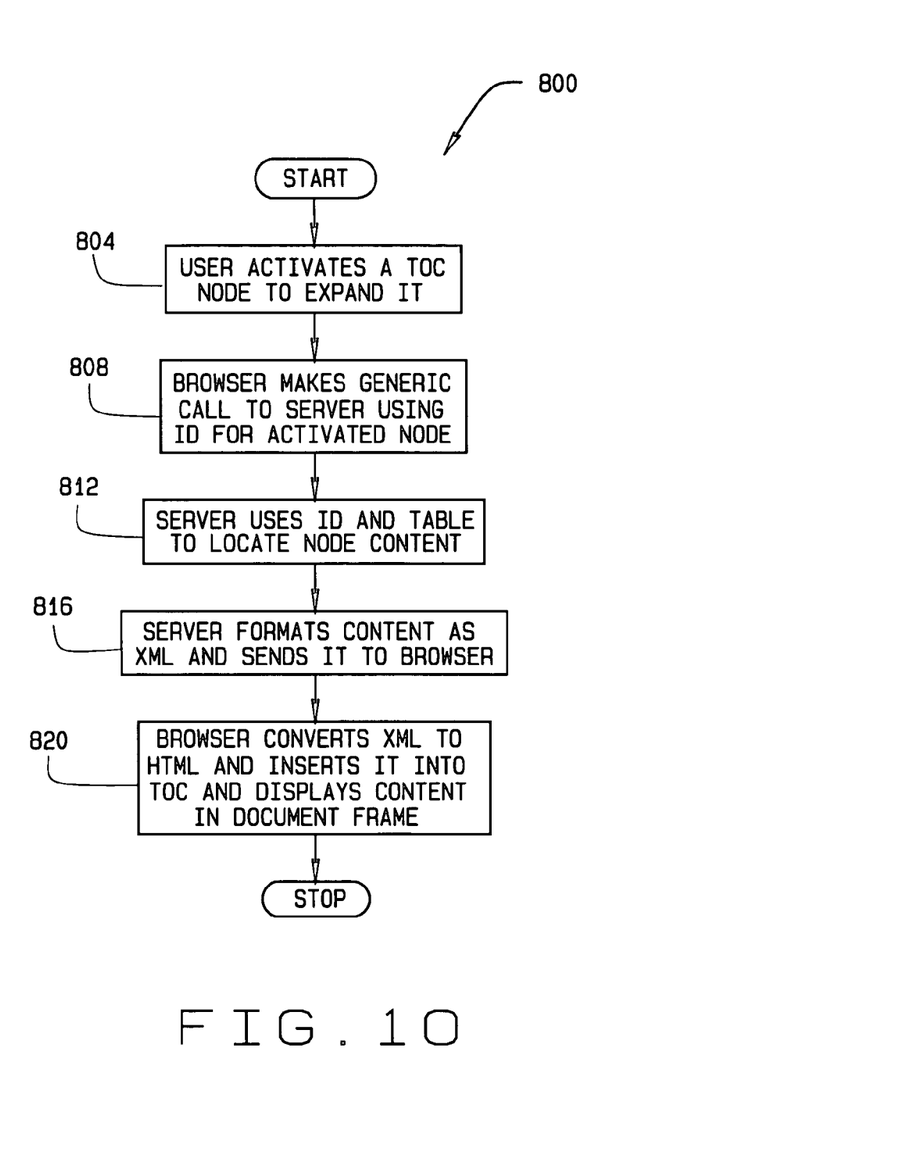
FIG. 10 is a flow diagram of a method of reviewing a document set according to one implementation of the invention.

It can be appreciated that a TOC can be configured recursively by using the above HTML syntax to nest TOC nodes within one another. When a TOC has been configured as described above, it can be used immediately to navigate into a document set referenced by the TOC. A user may review the document set in accordance with an exemplary method indicated generally in FIG. 10 by reference number 800. In step 804 the user activates a TOC node (e.g., a node 450 shown in FIG. 6A-6D) to expand it. In step 808 the browser 40 makes a generic call to the server 32 using the unique identifier 108 for the activated TOC node and requesting child content node(s) for the activated TOC node. In step 812 the server 32 uses the identifier 108 and the table 200 to locate content corresponding to the requested child node(s). In step 816 the server 32 formats the content as XML and returns the XML to the browser 40. In step 820 the browser converts the data to HTML, inserts it into the TOC in the appropriate location, and displays the content in the document frame 304. In some implementations, content referred to in the TOC is retrieved on demand only as it is requested when the user clicks to expand a node, and content is retrieved only once.

XML code formatted in accordance with one implementation is indicated generally in FIG. 11 by reference number 900. HTML code formatted from the XML code 900 in accordance with one implementation is indicated generally in FIG. 12 by reference number 950.

Implementations of the foregoing system and method make it possible to use relatively small data transfers to "drill down" into a TOC, regardless of the sizes of a subject document set and TOC. Thus the foregoing system and method provide significant improvement over traditional web TOC implementations, which require increasingly large amounts of data transfer as a document set and TOC become increasingly large.

Embodiments of the foregoing system and method allow a user to access information from very large documents over a limited bandwidth by minimizing a volume of material copied, that is, by limiting the volume of material copied to that specifically requested from a table of contents. The foregoing system makes it possible and easy for virtually any web application that uses a tree control, whether a client-side Microsoft ActiveX® object or a server-side XML tree control, to migrate to the foregoing system for improved performance with low-bandwidth and/or large data sets.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A computer-based system for accessing content, the system comprising:
one or more computers configured to:
configure unique identifiers recursively in a table of a database, each identifier corresponding to a content node of the database;
configure the table to include a row of parent-child pairs corresponding to each content node;
configure each row to identify only child nodes that are child nodes of the corresponding content node;
use one of the identifiers to retrieve information from the table for use by a browser in configuring one or more table of contents (TOC) nodes corresponding only to one or more child nodes identified in one of the rows;
use the information to configure the one or more TOC nodes recursively in a TOC; and
retrieve content corresponding to one of the TOC nodes when the TOC node is activated.

2. The system of claim 1, wherein the table represents the content nodes as parent-child pairs.

3. The system of claim 1, further comprising a server in communication with the database and configured to provide database content corresponding to the used identifier to the browser.

4. The system of claim 3, wherein the server converts the database content into XML.

5. The system of claim 1, wherein the browser is operable to nest a child TOC node within a parent TOC node.

6. The system of claim 1, wherein the browser is further operable to:
use an identifier of an activated TOC node to request database content corresponding to the activated TOC node; and
display the requested content.

7. The system of claim 1, wherein the browser is further operable to insert into the TOC a link to a user-specified document location.

8. A system-performed method of providing access to content in a database, the method comprising:
configuring unique identifiers recursively in a table of a database, each identifier corresponding to a content node of the database;
configuring the table to include a row of parent-child pairs corresponding to each content node;
configuring each row to identify only child nodes that are child nodes of the corresponding content node;
using one of the identifiers to retrieve information from the table for use by a browser in configuring one or more table of contents (TOC) nodes corresponding only to one or more child nodes identified in one of the rows;
using the information to configure the one or more TOC nodes recursively in a TOC; and
retrieving content corresponding to one of the TOC nodes when the TOC node is activated.

9. The method of claim 8, further comprising the browser inserting into the TOC a link to a user-specified document location.

10. The method of claim 8, wherein only content associated with an activated TOC node is retrieved.

11. The method of claim 8, wherein the information for configuring a TOC node includes displayable text associated with the TOC node.

12. The method of claim 8, further comprising nesting a child TOC node within a parent TOC node, said step performed by the browser.

13. The method of claim 8, further comprising using the information to provide a link in the TOC to a selected document and document location.

14. The method of claim 8, wherein to identify child nodes, if any, of a given content node exclusive of other content nodes, a server accesses a row of parent-child node pairs corresponding to the given content node.

15. Computer-readable, material media comprising computer-executable instructions for:
configuring unique identifiers recursively in a table of a database, each identifier corresponding to a content node of the database;
configuring the table to include a row of parent-child pairs corresponding to each content node;
configuring each row to identify only child nodes that are child nodes of the corresponding content node;
using one of the identifiers to retrieve information from the table for use by a browser in configuring one or more table of contents (TOC) nodes corresponding only to one or more child nodes identified in one of the rows;
using the information to configure the one or more TOC nodes recursively in a TOC; and
retrieving content corresponding to one of the TOC nodes when the TOC node is activated.

16. The media of claim 15, further comprising instructions for retrieving only content associated with an activated TOC node.

17. The media of claim 15, wherein the information for configuring a TOC node includes displayable text associated with the TOC node.

18. The media of claim 15, further comprising instructions executable by a browser for nesting a child TOC node within a parent TOC node.

19. The media of claim 15, further comprising instructions for:
- converting the information from the table into XML; and
- sending the XML to a GUI.

* * * * *